(12) United States Patent
Ohmori et al.

(10) Patent No.: US 6,339,431 B1
(45) Date of Patent: Jan. 15, 2002

(54) INFORMATION PRESENTATION APPARATUS AND METHOD

(75) Inventors: Yoshihiro Ohmori, Kanagawa-ken; Takeshi Nagai, Tokyo, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/395,221

(22) Filed: Sep. 14, 1999

(30) Foreign Application Priority Data

Sep. 30, 1998 (JP) ............................................. 10-279074

(51) Int. Cl.[7] .............................................. G06T 11/80
(52) U.S. Cl. ....................... 345/619; 345/585; 345/730; 345/732
(58) Field of Search ................................ 345/116, 433, 345/619, 604, 585, 586, 730, 731, 732, 733, 734; 707/500, 512, 530; 709/217, 205

(56) References Cited

U.S. PATENT DOCUMENTS

| 4,616,336 | A | * | 10/1986 | Robertson et al. | 707/512 |
|---|---|---|---|---|---|
| 5,581,682 | A | * | 12/1996 | Anderson et al. | 707/530 |
| 5,600,775 | A | * | 2/1997 | King et al. | 707/500 |
| 5,625,833 | A | * | 4/1997 | Levine et al. | 707/500 |
| 5,721,827 | A | * | 2/1998 | Logan et al. | 709/217 |
| 5,818,455 | A | * | 10/1998 | Stone et al. | 345/433 |
| 5,920,694 | A | * | 7/1999 | Carleton et al. | 709/205 |
| 6,006,241 | A | * | 12/1999 | Purnaveja et al. | 707/512 |

* cited by examiner

*Primary Examiner*—Matthew Luu
*Assistant Examiner*—Thu-Thao Havan
(74) *Attorney, Agent, or Firm*—Oblon, Spivak, McClelland, Maier & Neustadt, P.C.

(57) ABSTRACT

A data input section inputs time series data changeable over the passage of time. An annotation input section inputs an annotation related to at least one of the time series data. A transformation section transforms the annotation according to a correlation between the annotation and the time series data. An output section outputs the transformed annotation combined with the time series data.

21 Claims, 20 Drawing Sheets

INFORMATION PRESENTATION APPARATUS AND METHOD

FIELD OF THE INVENTION

The present invention relates to an information presentation apparatus and a method to transform an annotation related with time series data according to any change in the time series data while outputting the time series data.

BACKGROUND OF THE INVENTION

In present systems, a user can input an annotation to a dynamic image displayed on a portable terminal using a pointing device. This input method is classified into the following two types.

Another screen type (The annotation is written on an area different from a screen displaying the dynamic image)

Same screen type (The annotation is written on the screen displaying the dynamic image)

In the another screen type, the user inputs the annotation as handwriting character on the area different from the screen. For example, this method is well known as shown in Japanese Patent disclosure (Kokai) PH2-56069. However, in this method, the user can not indicate a part of the dynamic image related to the annotation on the screen.

In the same screen type, the user inputs the annotation by handwriting a character on the screen displaying the dynamic image. In this method, the annotation is directly written on the dynamic image. For example, a circle mark is added to a human face image by handwriting. In short, the user can input the annotation by indicating a related part of the dynamic image.

The same screen type is further classified into following two types.

Static image type (The annotation is input by stopping update of the dynamic image on the screen)

Direct type (The annotation is input while updating the dynamic image on the screen)

In the static image type, the update of the dynamic image on the screen is stopped while the user writes the annotation. This method is well known as shown in Japanese Patent Disclosure (Kokai) PH10-28250. In this case, a method to memorize the annotation is the same as writing on the static image. A frame (one image) to which the annotation is added is displayed as a representative image of the dynamic images neighboring this frame. For example, the representative image is used for retrieving the user's desired dynamic image. Furthermore, in case of playing the dynamic image including this frame, the annotation is continuously displayed with not only this frame but also following images in order to show existence of the annotation.

However, in the static image type, update of the dynamic image on the display is stopped during inputting the annotation. Therefore, the user can not confirm the dynamic image for this period. Furthermore, in case of playing the dynamic image including the annotation, for example, in case of adding the handwritten circle mark to the person face image on display, the content of the dynamic image changes after several seconds pass. As a result, the circle mark indicates another part on the image. In short, even if the content of the dynamic image largely changes on the display, the annotation remains at the same position on the display and the user is confused by watching this dynamic image.

On the other hand, in the direct type, the annotation is added while updating the dynamic image on the display. For example, in the case of explaining of baseball, a commentator traces a locus of a ball on the display by using a handwriting pen while playing the dynamic image of movement of the ball. In this method, the user can updately write the locus of the ball in proportion to changes in the movement of the ball on the display. However, in the case of adding a circle mark surrounding the ball on the display by handwriting, the content of the dynamic image continuously changes on the display during the user's writing the circle mark. As a result, the user mistakenly writes a distorted shape mark (the annotation) for the ball. In short, the dynamic image continuously changes over time. Therefore, the user's annotation is not matched with the content of the dynamic image on the display over the passage of time.

SUMMARY OF THE INVENTION

It is an object of the present invention to provide an information presentation apparatus and a method to display an annotation matched to the content of the dynamic image while displaying the dynamic image changing over time.

According to the present invention, there is provided an information presentation apparatus, comprising: data input means for inputting time series data changeable by passage of time in order; annotation input means for inputting an annotation related to at least one of the time series data; transformation means for transforming the annotation according to a correlation between the annotation and the time series data to be outputted; and output means for outputting the transformed annotation combined with the time series data.

Further in accordance with the present invention, there is also provided an information presentation method, comprising the steps of: inputting time series data changeable by passage of time in order; inputting an annotation related to at least one of the time series data; transforming the annotation according to correlation between the annotation and the time series data to be outputted; and outputting the transformed annotation combined with the time series data.

Further in accordance with the present invention, there is also provided computer readable memory containing computer readable instructions, comprising: instruction means for causing a computer to input time series data changeable by passage of time in order; instruction means for causing a computer to input an annotation related to at least one of the time series data; instruction means for causing a computer to transform the annotation according to correlation between the annotation and the time series data to be outputted; and instruction means for causing a computer to output the transformed annotation by combining with the time series data.

DETAILED DESCRIPTION OF THE PREFERRED EMBODIMENT

Figure 1:
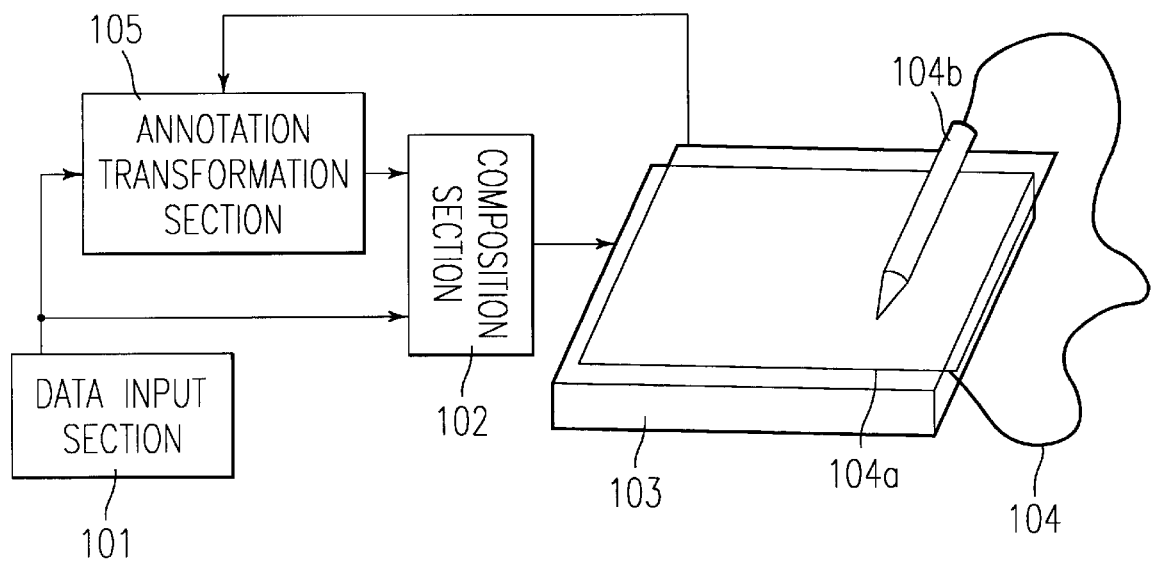
FIG. 1 is a block diagram of the information presentation apparatus according to the first embodiment of the present invention.

FIG. 1 is a block diagram of the information presentation apparatus according to a first embodiment of the present invention. For example, time series data such as dynamic images changeable over the passage of time are displayed. The user inputs (writes) the annotation of the dynamic image on the display by a pointing device. In the information presentation apparatus of FIG. 1, data input section 101 inputs the dynamic image as the time series data. An annotation input section 104 inputs the handwritten figure as the annotation by using a tablet 104a and a pen 104b. An annotation transformation section 105 transforms the annotation input from the annotation input section 104 according to changes in the dynamic image input from the data input section 101. A composition section 102 combines the annotation transformed by the annotation transformation section 105 with the dynamic image input from the data input section 101. If the annotation is not supplied from the annotation transformation section 105, the composition section 102 outputs the dynamic image as it is. An output section 103 displays the dynamic image including the annotation supplied from the composition section 102.

Figure 2:
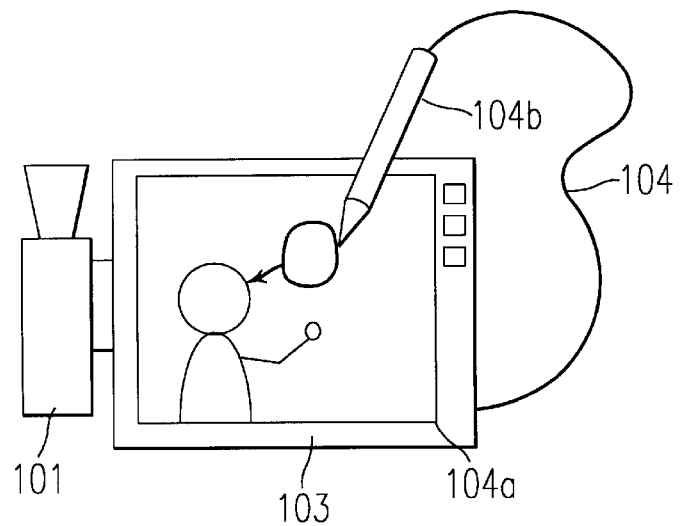
FIG. 2 is a schematic diagram of an information presentation apparatus.

FIG. 2 shows one example of an appearance of the information presentation apparatus. For example, if the data input section 101 such as TV camera inputs a person's dynamic image, this dynamic image is displayed through the tablet 104a on the output section 103. The user writes a figure of the annotation for the dynamic image on the tablet 104a by using the pen 104b. In this case, the annotation is transformed by the annotation transformation section 105 in relation to change of the dynamic image to be displayed.

The change of the dynamic image includes the following two situations.

The dynamic image gradually changes (a continuity of little changes in the content of the dynamic image)

A scene change of the dynamic image changes (large change in the content of the dynamic image)

Figure 3A:
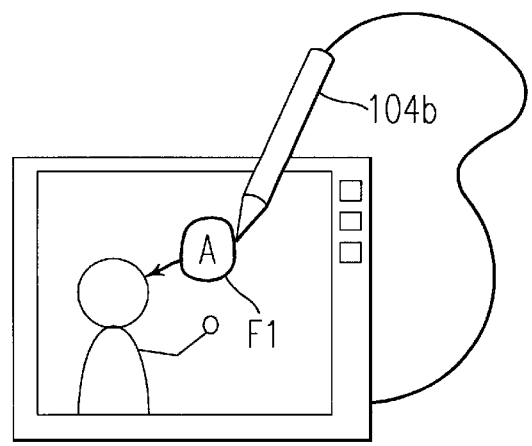
FIGS. 3A~3D are schematic diagrams of elimination of the annotation by scene change.
Figure 3B:
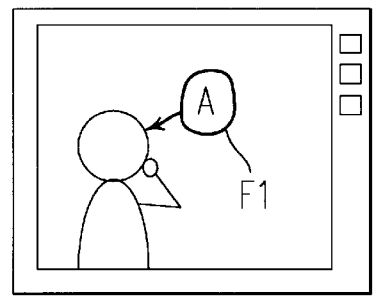
Figure 3C:
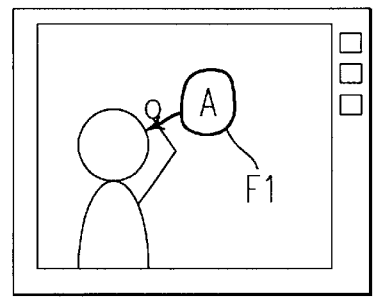
Figure 3D:
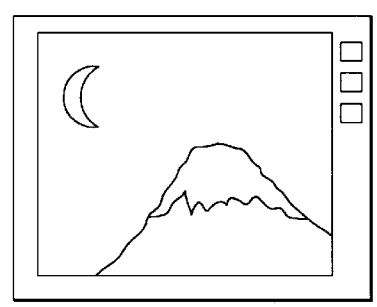

In case of the scene change of the dynamic image, transformation of the annotation in relation to the scene change is explained. FIGS. 3A~3D show screens in which the annotation is eliminated when the dynamic image includes scene change. As shown in FIG. 3A, assume that the user inputs the annotation F1 on the output section 103 (tablet 104a) by using the pen 104b. The annotation F1 in the dynamic image is displayed as shown in FIGS. 3B and 3C. Then, as shown in FIG. 3D, content of the dynamic image is changed and the annotation F1 is eliminated.

First, the data input section 101, comprised of the camera shown in FIG. 2 or TV receiving set, inputs the dynamic image. The dynamic image is comprised of a series of static images. One static image is called a "frame". The data input section 101 periodically inputs the frame as the dynamic images. FIGS. 3A~3D show four continuous frames. The dynamic image is combined with the handwritten figure F1 as the annotation by the composition section 102, and displayed through the output section 103. Before the annotation is supplied to the composition section 103, the annotation is transformed by the annotation transformation section 105. This transformed annotation is combined with the dynamic image to be displayed.

The output section 103 is, for example, comprised of a liquid crystal screen, and displays the input dynamic image. The user can monitor the dynamic image by watching the output section 103. In this way, the person's dynamic image is displayed as shown in FIG. 3A.

The annotation input section 104 is, for example, comprised of a transparent pressure sensitive tablet 104a fixedly overlapped on the output section 103, and a pen 104b to draw the handwriting figure on the tablet 104a. The user inputs the handwriting figure as the annotation. When the pen 104b touches the tablet 104a, the tablet 104a continuously generates coordinate values of the part touched by the pen 104b, and outputs the coordinate values to the annotation transformation section 105.

When the annotation transformation section 105 detects that the content of the dynamic image changes (scene change), the annotation transformation section 105 eliminates the handwritten figure of the annotation in the dynamic image. If the content of the dynamic image does not change, the annotation transformation section 105 outputs the handwritten figure of the annotation as it is. In this way, the handwritten figure F1 of the annotation is displayed as shown in FIGS. 3A~3C. The dynamic images in FIGS. 3A~3C do not include the scene change. Therefore, the annotation is displayed by combining with the dynamic image.

Figure 4:
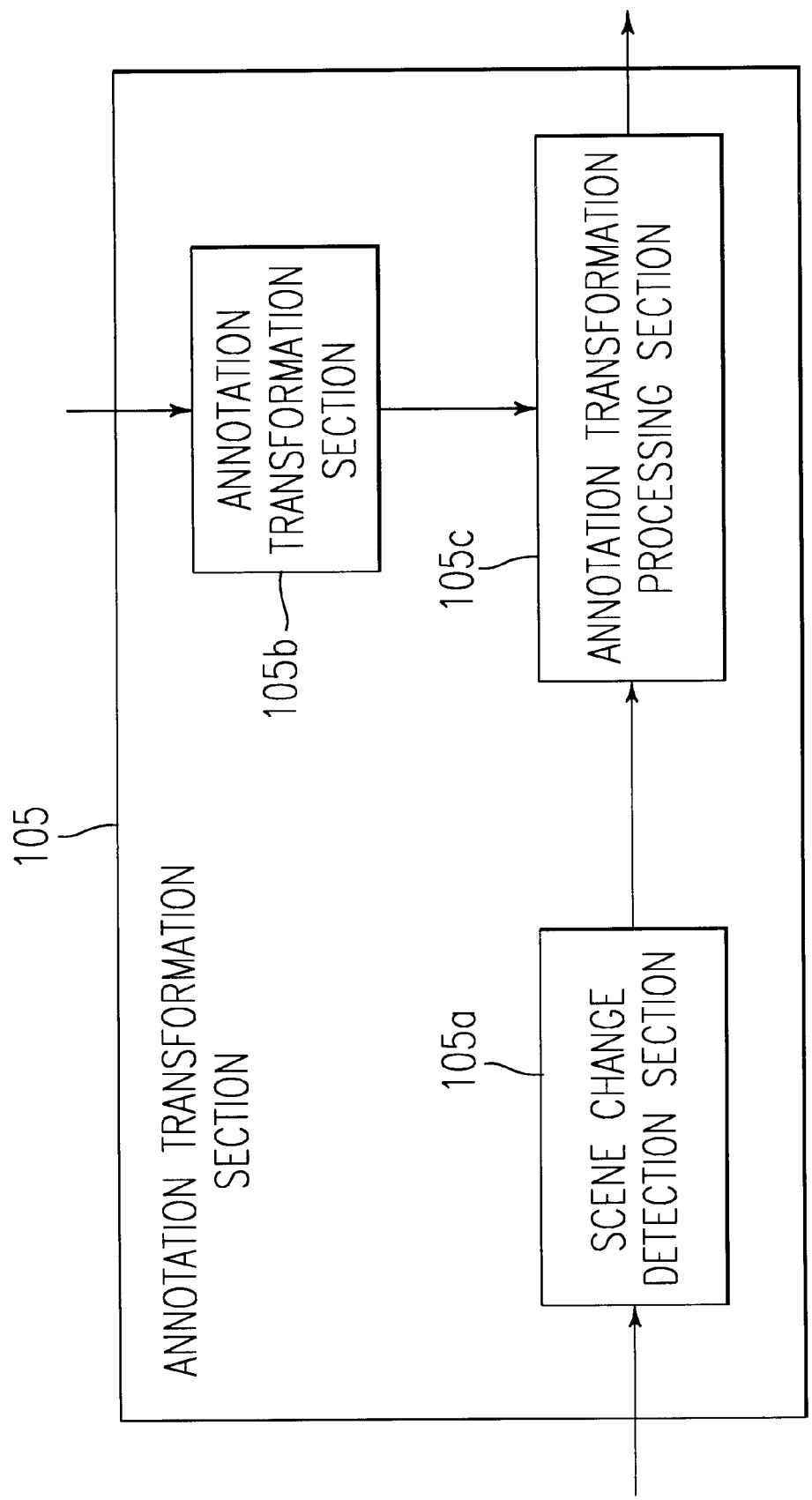
FIG. 4 is a block diagram of an annotation transformation section in the information presentation apparatus of FIG. 1.

FIG. 4 is a block diagram of the annotation transformation section 105. In FIG. 4, a scene change detection section 105a detects whether the dynamic image from the data input section 101 includes a scene change. An annotation memory section 105b stores the coordinate values of the handwritten figure outputted from the annotation input section 104. If the scene change is not detected, an annotation transformation processing section 105c generates a locus image of the pen 104b drawn on the tablet 104a by connecting the coordinate values as a straight line. If a scene change is detected, the annotation transformation processing section 105c eliminates the coordinate values of the annotation in the annotation memory section 105b in order to eliminate the handwritten figure of the annotation on the display section 103.

Figure 5:
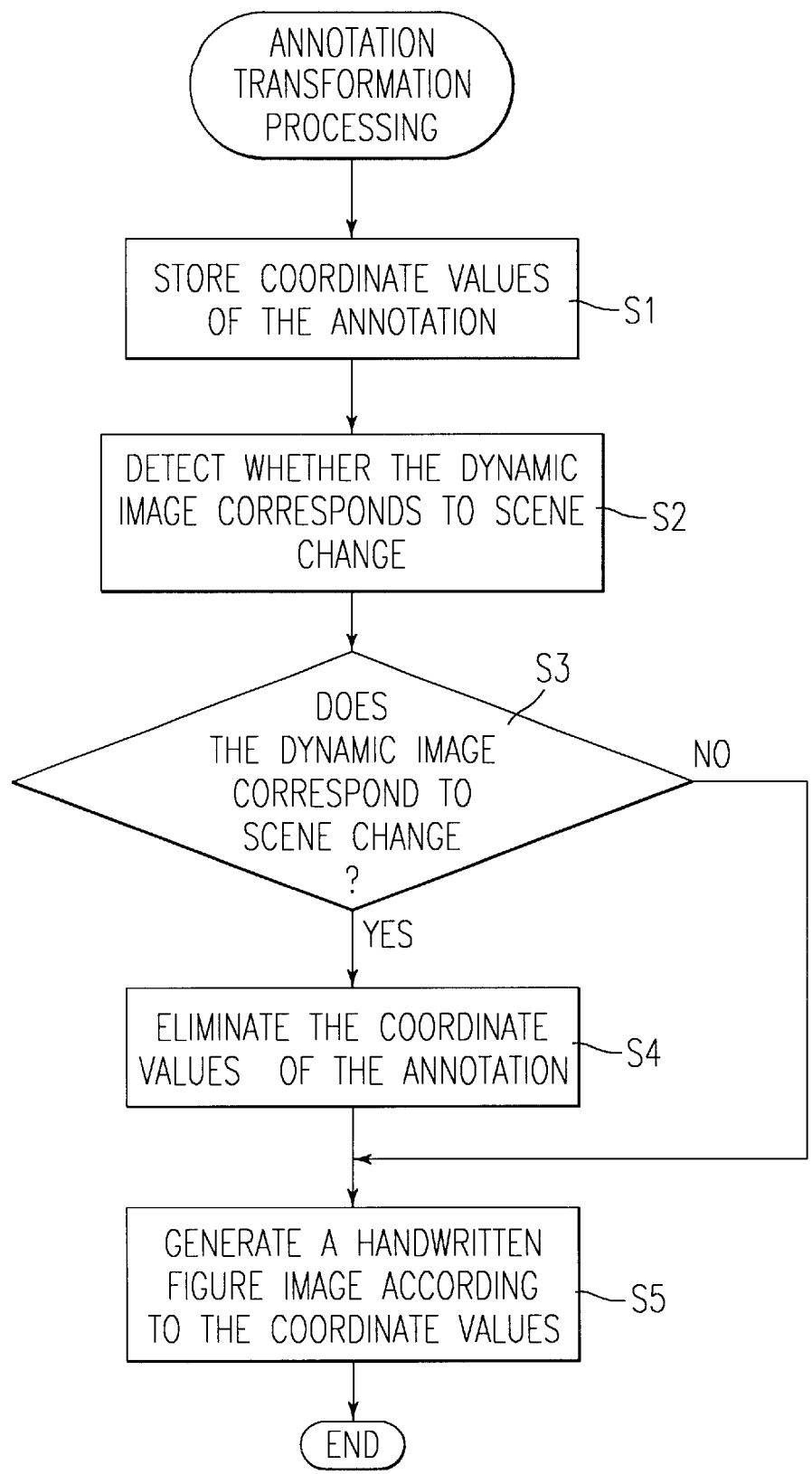
FIG. 5 is a flow chart of processing of the annotation transformation section in FIG. 4.

FIG. 5 is a flow chart of processing of the annotation transformation section 105. The annotation memory section 105b stores the coordinate values outputted from the annotation input section 104 (S1). The scene change detection section 105a detects whether the dynamic image to be displayed corresponds to the scene change (S2). In case of the scene change (S3), the annotation transformation processing section 105c eliminates the coordinate values in the annotation memory section (S4). In case of non-scene change, the annotation transformation processing section 105c generates the locus image of the handwritten figure by connecting the coordinate values stored in the annotation memory section 105b, and outputs the locus image through the output section 103. The scene change represents that content of the present dynamic image that is different from the content of a series of previous dynamic images. For example, assume that the person image is displayed in three successive dynamic images as shown in FIGS. 3A~3C and a landscape image is displayed in the next dynamic image as shown in FIG. 3D. In this case, the dynamic image in FIG. 3D corresponds to the scene change. As a method for detecting the scene change, for example, change quantity D of intensity value of corresponding pixels between two successive images is calculated. If the change quantity D is above a threshold, the scene change is decided to be generated. Assume that the pixel value of the coordinate (x, y) at timing t is Pt(x, y) and the moving vector of the coordinate (x, y) from timing (t−1) to timing t is (mvx, mvy). The change quantity D is represented as follows.

$$D = \sum_x \sum_y \{P_t(x, y) - P_{t-1}(x + mvx, y + mvy)\} \qquad (1)$$

If the change quantity D is above the threshold $D_0$, the dynamic image at time t corresponds to the scene change. In FIGS. 3B and 3C, the change quantity D is not above the threshold $D_0$ because contents of these two images are almost the same. Therefore, the annotation displayed on screen in FIG. 3A is also displayed on screen as shown in FIGS. 3B and 3C. On the other hand, in FIG. 3D, the content of the dynamic image is the landscape changed from the dynamic image in FIG. 3C. In this case, the change quantity D is above the threshold $D_0$ and the dynamic image in FIG. 3D is decided as the scene change frame. Accordingly, the annotation displayed in FIGS. 3A~3C is eliminated by the annotation transformation section 105. As a result, the dynamic image without the annotation is displayed as shown in FIG. 3D. As for new dynamic image inputted after the dynamic image in FIG. 3D, the annotation is not displayed. Therefore, it is not happened that the user mistakenly understands the annotation not related with content of the dynamic image.

As mentioned-above, in the first embodiment, the annotation is only displayed during the dynamic image related with the annotation is displayed. In other words, the annotation is not displayed while the dynamic image not related with the annotation is displayed. Therefore, it is not happened that unnecessary annotation hinders the user to watch the dynamic image and the user mistakenly understand the content of the dynamic image by watching the unnecessary annotation.

Figure 6A:
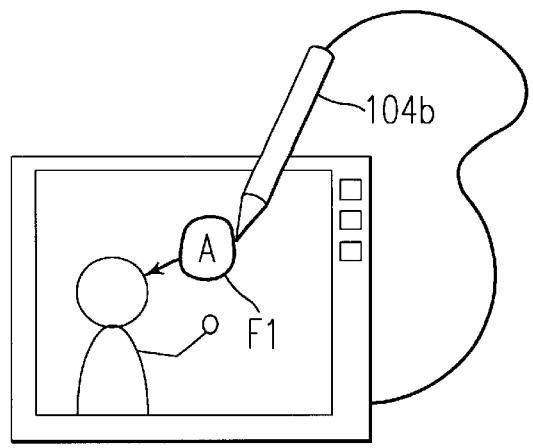
FIGS. 6A~6D are schematic diagrams of gradual elimination of the annotation over the passage of time.
Figure 6B:
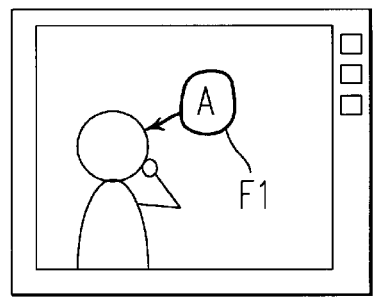
Figure 6C:
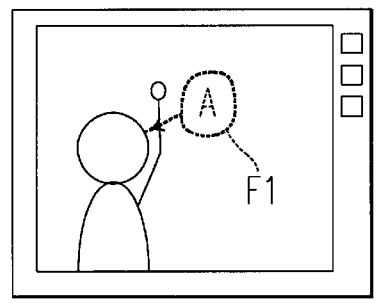
Figure 6D:
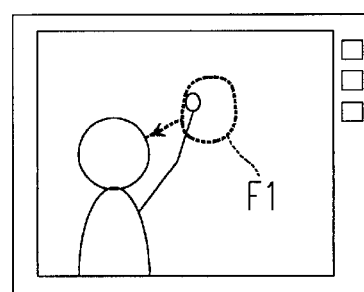

In the first embodiment, the annotation is eliminated in case of detecting the scene change. However, the annotation may be transformed according to the passage of time. For example, as shown in FIG. 6A, assume that the input of the annotation F1 is completed. In this case, as shown in FIGS. 6B~6D, the annotation F1 is gradually eliminated over the passage of time. Process of gradual elimination of the annotation F1 is represented in order as a thick solid line, a thin solid line, a thick dotted line and a thin dotted line. Alternatively, the annotation F1 may be immediately eliminated after a predetermined time from the input timing. In short, in this modified embodiment, the annotation is not eliminated even if the scene change is detected, but gradually eliminated over the the passage of time. Therefore, the user can understand when the annotation is added to the dynamic image by watching color degree of the annotation. Furthermore, in case of the dynamic image whose content does not change for a long time, it is avoided that the annotation is continuously displayed for a long time.

Figure 7A:
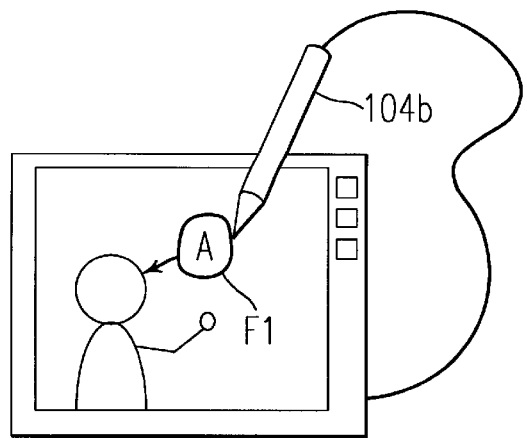
FIGS. 7A~7D are schematic diagrams of gradual elimination of a plurality of annotations over the passage of time.
Figure 7B:
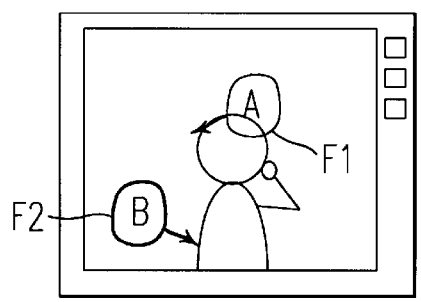
Figure 7C:
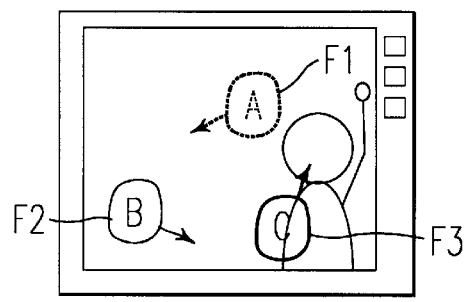
Figure 7D:
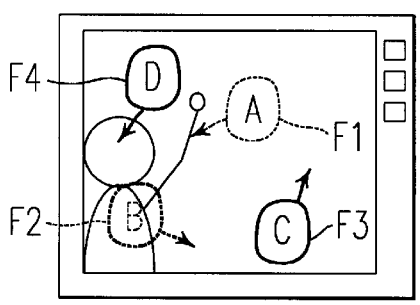

FIGS. 7A–7D show screens in which the annotation is gradually eliminated over the the passage of time in case of the dynamic images whose content does not change for a long time. As shown in FIGS. 7A–7D, the annotations (F1~F4) are inputted one by one for each dynamic image. In FIG. 7A, the annotation F1 indicating head part of the person image is inputted. However, in FIG. 7D, this head part moves to another position and presentation of the annotation F1 is useless.

Figure 8:
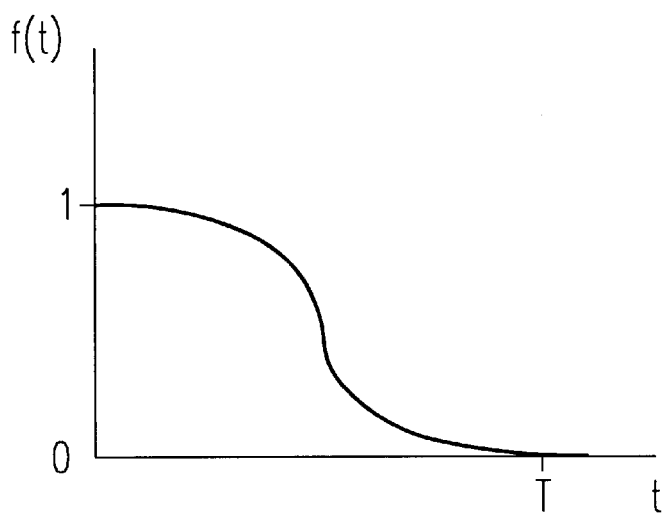
FIGS. 8, 9, 10 and 11 are schematic diagrams of examples of function f(t) to transform the annotation by the passage of time.

As a method for gradually eliminating the annotation, change of intensity degree of the annotation is represented as time function f(t). For example, assume that pixel value of the annotation is "add_data (x, y)", pixel value of display data by combining the dynamic image with the annotation is "disp_data (x, y)", variable representing time is t, the content of the dynamic image changes (scene change) at timing "t=0", the annotation is eliminated on the screen at timing T. In this case, the intensity degree of the annotation changes by the function f(t) shown in FIG. 8. Assume that pixel value of coordinate (x, y) in each frame of the dynamic images is "input_data (x, y)". The display data "disp_data (x, y)" at timing t is calculated by adding "input_data (x, y)" to a multiplication of "add_data (x, y)" with f(t) as follows.

$$\text{disp\_data } (x, y) = \text{input\_data } (x, y) + \{f(t) \cdot \text{add\_data } (x, y)\} \qquad (2)$$

Figure 9:
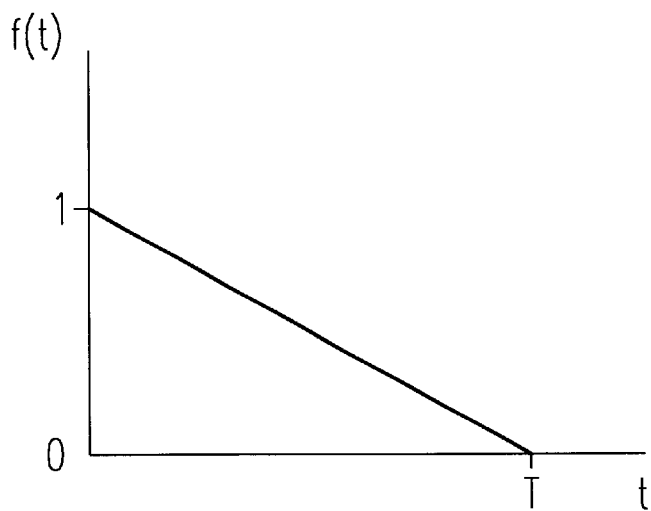
Figure 10:
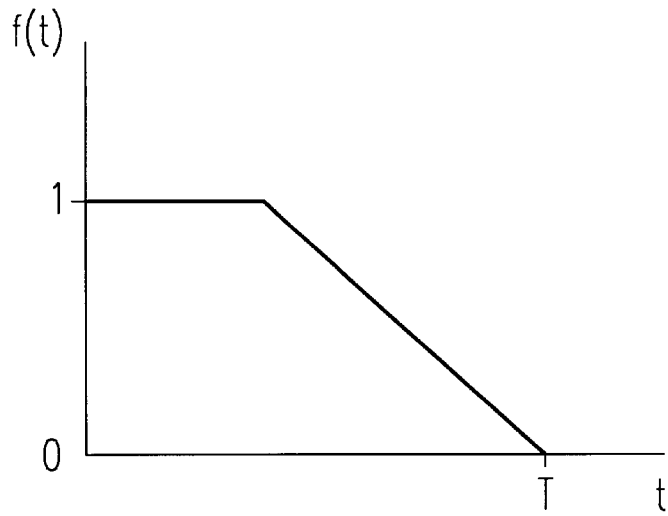
Figure 11:
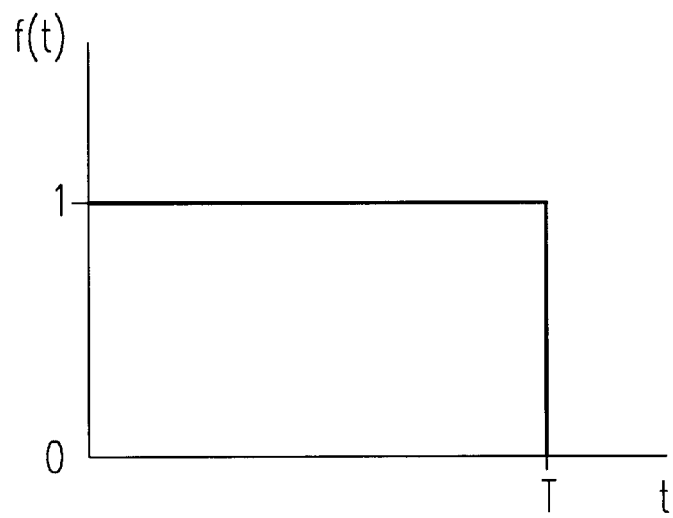

The function f(t) may be set as a function so that "f(t)=1 at timing t=0" and "f(t)=0 at timing t=∞". Otherwise, the function f(t) is selectively used as shown in FIGS. 9~11. Especially, the function f(t) shown in FIG. 11 is a special example. If the display data "disp_data(x, y)" is calculated by the equation (2) and the function f(t) in FIG. 11, the annotation is continuously displayed for a period of time T from input timing of annotation, and eliminated after passing of time T.

As a method for changing the annotation by the passage of time, the color of the annotation may be changed. Furthermore, the gradual elimination of the annotation by the passage of time may be combined with transformation of the annotation by the scene change in the first embodiment. In this case, the annotation is normally displayed until the scene change is detected, and gradually eliminated after the scene change is detected. In short, the annotation is correctly displayed during a period that the dynamic image related with the annotation is displayed.

In the above-mentioned modification, the change quantity of pixel value between two successive frames is calculated, and the scene change is decided to be occurred if the change quantity is above the threshold. However, if the dynamic image is coded data using MPEG and so on, the scene change may be detected by characteristic quantity (for example, moving vector, total sum of code quantity of the moving vector, direct corrent component of color difference) extracted from the dynamic image.

Figure 12:
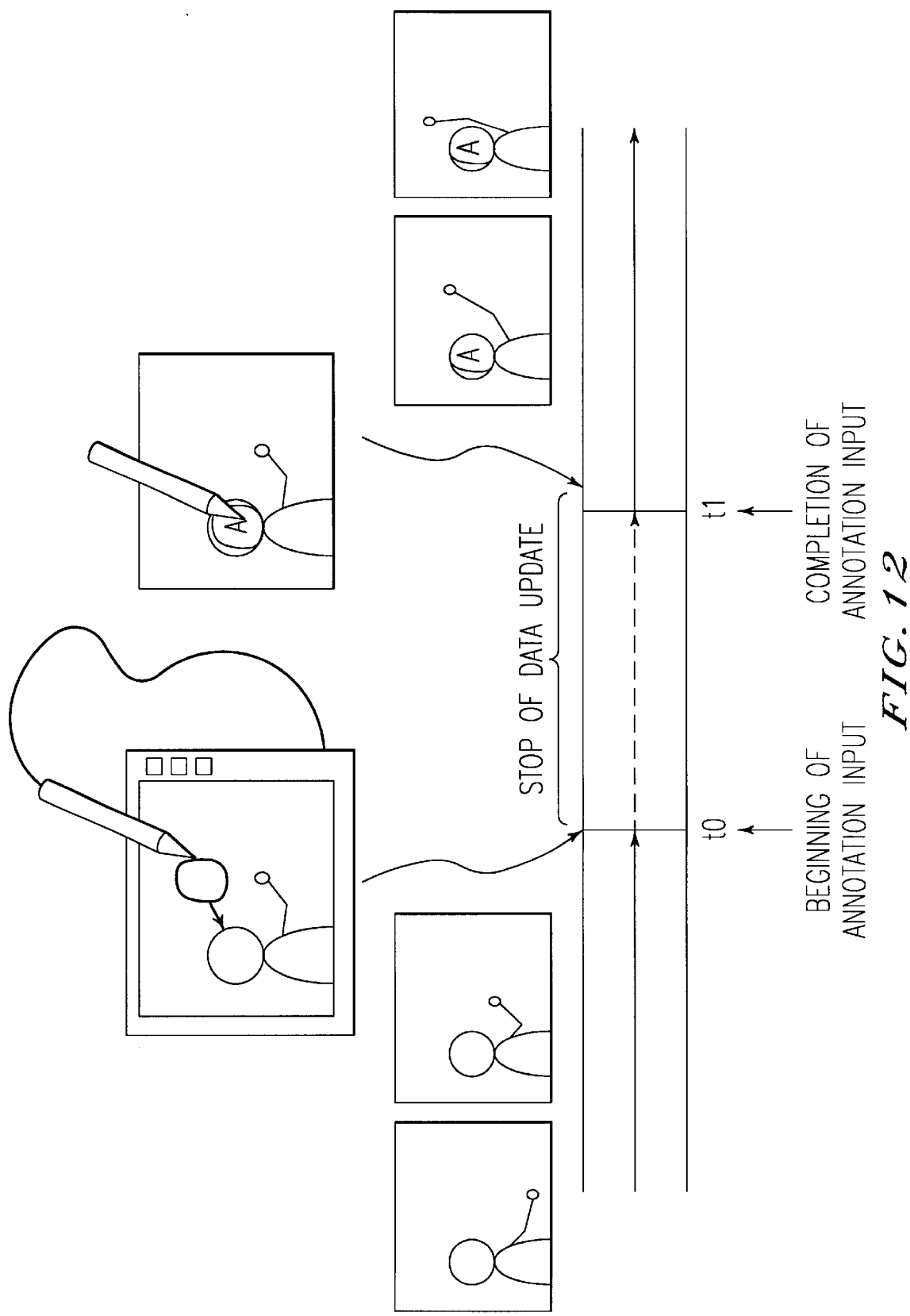
FIG. 12 is a schematic diagram of a time chart showing stop of update of the dynamic image in case of inputting the annotation.

In the first embodiment, the user inputs the handwritten figure as the annotation while the dynamic image is updately displayed. However, in this case, even if the user begins to draw the handwritten figure on the dynamic image to which the annotation is added, this dynamic image is often replaced by another dynamic image when the user completes drawing of the handwritten figure. Therefore, when the user begins to draw the handwritten figure, update of display of the dynamic image may be stopped as static image. For example, as shown in FIG. 12, assume that the user begins to draw the annotation at timing t0 and completes to draw the annotation at timing t1. In this case, by detecting the user's first drawing operation at timing t0, the update of the dynamic image on the output section 103 is stopped and the user draws the annotation on the static image. By detecting completion of the user's drawing operation at timing t1, the dynamic image is updately displayed from the static image. In short, the dynamic image is displayed as the static image during the user's input operation of the annotation. Therefore, the user can easily input the annotation.

Furthermore, the update of the dynamic image may be stopped when the user intentionally indicates the beginning of annotation input to the apparatus (for example, pushing a button). In this case, the dynamic image is updately displayed again when the user indicates the completion of annotation input, when the pen 104b detached from the tablet 104a, or when a closed figure is drawn by the pen 104b.

Next, the second embodiment, wherein the object in the dynamic image is decided and the annotation is transformed by change of the object, is explained. In this case, the object represents object information used for MPEG 4, which is each subject or each part of the subject in the dynamic image. In the first embodiment, by detecting the scene change, the annotation such as the handwritten figure is eliminated on the display. In this case, if the annotation is added to a person's image in the dynamic image and the person's image moves to another position, the annotation is fixedly displayed at the input position. However, in the second embodiment, the annotation is also moved by moving of the person's image in the dynamic image.

Figure 13:
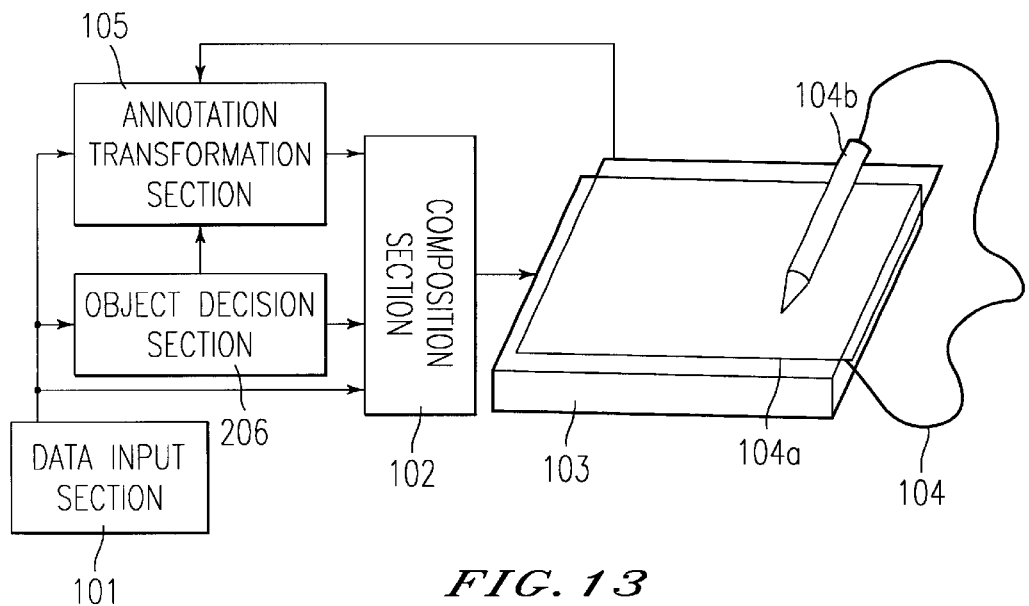
FIG. 13 is a block diagram of the information presentation apparatus according to the second embodiment of the present invention.

FIG. 13 is a block diagram of the information presentation apparatus according to the second embodiment. In the same way as in the first embodiment, the dynamic image changeable over the passage of time is displayed on the output section 103 through the tablet 104a and the annotation is additionally input to the dynamic image by the pen 104b. Especially, in the second embodiment, an object decision section 206, which decides the object in the dynamic image and outputs the decision result to the annotation transformation section 105, is newly included. In FIG. 13, the dynamic image (time series data) from the data input section 101 is input to the composition section 102. The composition section 102 generates the display data by combining the dynamic image with the annotation from the annotation transformation section 105. The annotation is input through the annotation input section 104 by the user, and supplied to the annotation transformation section 105. The object decision section 206 decides each object in the dynamic image input from the data input section 101. This decision result information is supplied to the annotation transformation section 105. The annotation transformation section 105 determines a transformation method by the dynamic image from the data input section 101, the annotation from the annotation input section 104, and the decision result information form the object decision section 206. The annotation is transformed by the determined method. This transformed annotation is supplied to the composition section 102. The composition section 102 combines the transformed annotation with the dynamic image. This combined image is displayed through the output section 103.

Figure 14:
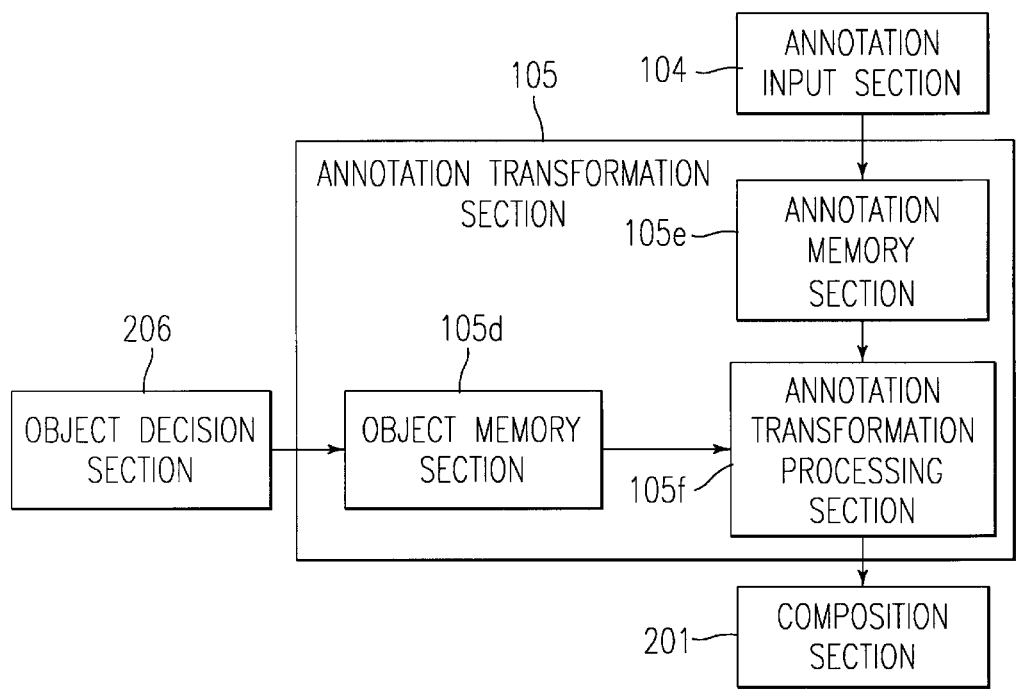
FIG. 14 is a block diagram of the annotation transformation section in the information presentation apparatus of FIG. 13.

In following explanation, the dynamic image of format of MPEG 4 is used as an example. A method for detecting the object and a method for transforming the annotation are explained. FIG. 14 is a block diagram of the annotation transformation section 105 in FIG. 13. In FIG. 14, an object memory section 105d stores the decision result information from the object decision section 206. An annotation memory section 105e stores the annotation from the annotation input section 104. An annotation transformation processing section 105f determines the transformation method according to the decision result information and the annotation, and transforms the annotation (for example, moving of display position of the annotation) by the determined method.

Figure 15:
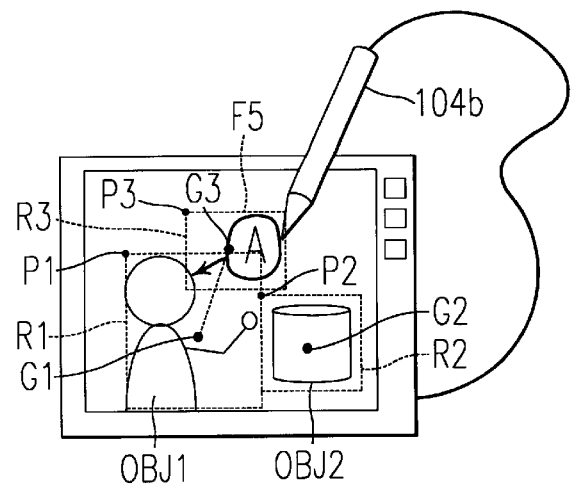
FIG. 15 is a schematic diagram of a screen including the annotation related with one of a plurality of objects.
Figure 16:
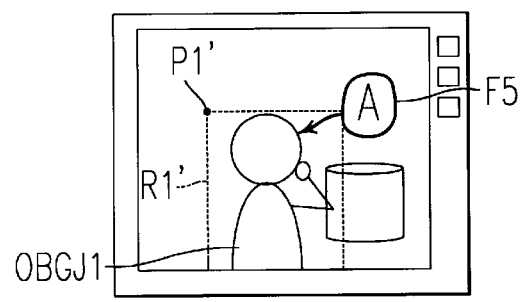
FIG. 16 is a schematic diagram of a screen including the annotation transformed by object movement.
Figure 17:
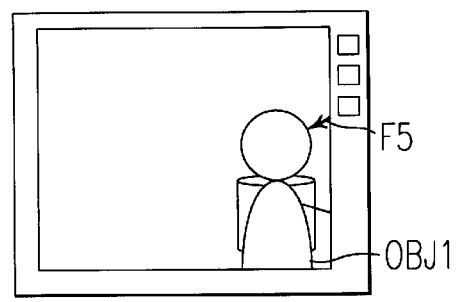
FIG. 17 is a schematic diagram of a screen in which the annotation disappears by object movement.

Next, processing of the annotation transformation section 105 is explained by referring to FIGS. 15~17. The dynamic image of MPEG4 in FIG. 15 includes a minimum rectangular area R1 including a person object image OBJ1 and a minimum rectangular area R2 including a column image OBJ2. When the user inputs the annotation F5 during displaying the dynamic image shown in FIG. 15, the object decision section 206 decides existence of two objects OBJ1 and OBJ2 in the dynamic image, and extracts the rectanglar areas R1 and R2. The object memory section 105d stores a display position P1 (X1, Y1) of the area R1 and a display position P2 (X2, Y2) of the area R2 supplied from the object decision section 206. As for the display position of the object related with the annotation, the object memory section 105d stores the display position of the object in previous frame as variable m and the display position of the object in present frame as variable M.

As shown in FIG. 15, if the object memory section 105d newly stores information of two objects OBJ1 and OBJ2, the annotation transformation processing section 105f decides which object the user inputs the annotation. In this case, as shown in FIG. 15, each distance between a coordinate of the center of gravity of the minimum rectanglar area including each object and a coordinate of the center of gravity of the minimum rectanglar area including the annotation is calculated. One object of the shortest distance is decided as the object related with the annotation. In FIG. 15, it is decided which one of the center of gravity G1 of the area R1 of the object OBJ1 and the center of gravity G2 of the area R2 of the object OBJ2 is nearer to the center of gravity G3 of the area R3 of the annotation F5. In this case, the object OBJ1 is decided to be nearer to the annotation F5. As the decision method, any method to specify the object related with the annotation may be used.

The object memory section 105d stores the display position P1 of the area R1 of the object OBJ1 as the variable M. If the object OBJ1 is newly detected from the present frame, the display position P1 is also stored as the variable m. As shown in FIG. 16, assume that the object OBJ1 is extracted from present frame. In this case, the display position P1 of the object OBJ1 stored in the variable M obtained from previous frame is transferred to the variable m, and new display position P1' in the present frame is stored as the variable M. By referring to the display position stored as the variables M, m, the annotation transformation processing section 105f calculates a moving distance (Xm, Ym) of the object OBJ1 from the previous frame to the present frame, and moves the display position of the annotation as (Xm, Ym) on the present frame. This annotation image is supplied to the composition section 102. The composition section 102 creates the present frame in which the moved annotation F5 is combined with the area R1' of the object OBJ1. This combined image is displayed through the output section 103 as shown in FIG. 16. In FIG. 16, the object OBJ1 is moved from P1 to P1' and the annotation F5 is also moved as equal distance from P1 to P1'. If the object does not moved from the previous frame to the present frame (the display position is same (M=m)), the moving distance of the annotation is also (0, 0). In this case, the annotation is displayed at same position.

As mentioned-above, in the second embodiment, as for fine change such as moving of the object in the dynamic image, the display position of the annotation is moved in relation to the moving of the object. Therefore, the annotation is continuously displayed while position relation between the annotation and the object at the input timing of the annotation is remained.

In case of moving the annotation, by combining the elimination method of the first embodiment, the annotation may be eliminated by the passage of time while the display position of the annotation is moved in proportion to the moving of the object.

Figure 18A:
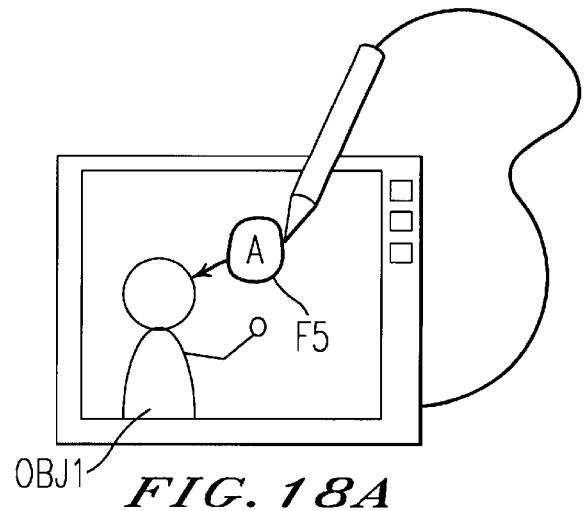
FIGS. 18A~18C are schematic diagrams of screens to newly display a reflected image of the annotation by object movement.
Figure 18B:
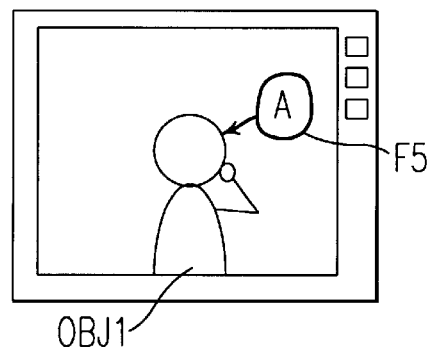
Figure 18C:
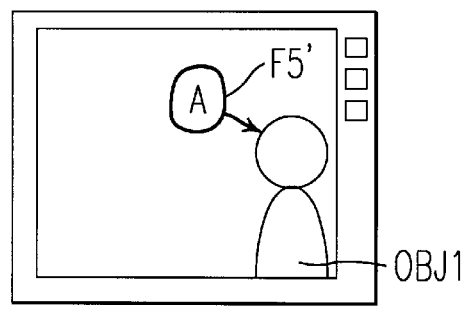

In the second embodiment, the annotation is moved the same distance as the object. However, as shown in FIG. 17, the annotation F5 often disappears when the display position of the annotation moves in synchronization with the object OBJ1 movement. In this case, as shown in FIGS. 18A and 18B, if all image area of the annotation is located inside the frame when the display position of the annotation is moved, the annotation is displayed as it is. As shown in FIG. 18C, when all image area of the annotation is located outside the frame when the display position of the annotation is moved, a reflected image F5' of the annotation F5 may be displayed at opposite position of the object OBJ1. As a method to generate the reflected image F5', a symmetric image of the annotation F5 for a vertical line passing through a center of gravity of the object OBJ1 is created on the frame.

Figure 19A:
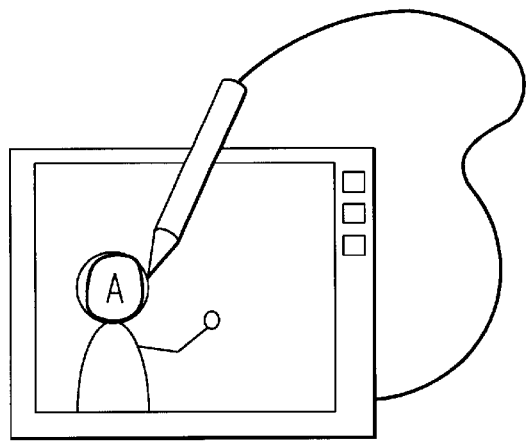
FIGS. 19A~19C are schematic diagrams of screens to display enlarged annotation by enlargement of the object.
Figure 19B:
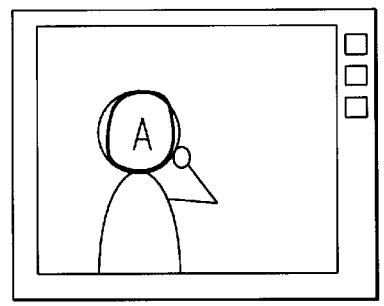
Figure 19C:
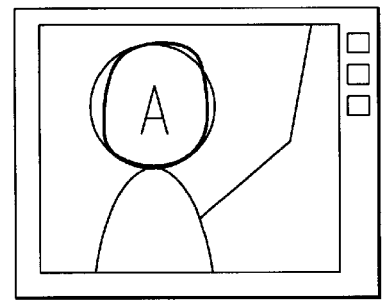

Furthermore, the annotation may be transformed by not only object movement but also by transformation of the object. The object in the dynamic image is often enlarged/reduced as zoom-in/zoom-out. In this case, as shown in FIGS. 19A–19C, the annotation is also enlarged/reduced in proportion to enlargement/reduction of the object. As a result, the annotation is continuously displayed while the position relation between the annotation and the object at the input of the annotation remains the same.

Figure 20A:
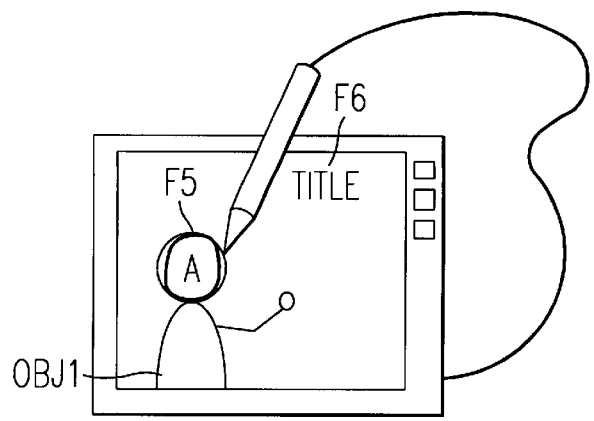
FIGS. 20A~20D are schematic diagrams of screens including the annotation related with background area of the dynamic images.
Figure 20B:
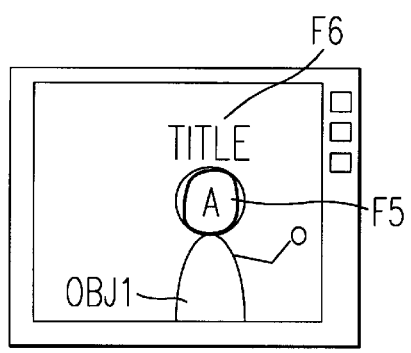
Figure 20C:
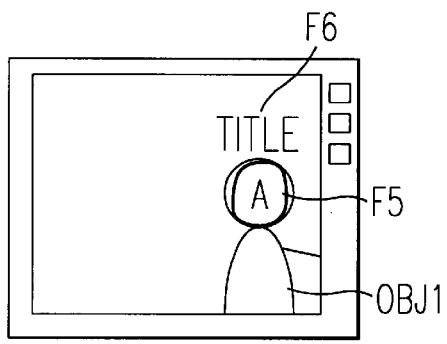
Figure 20D:
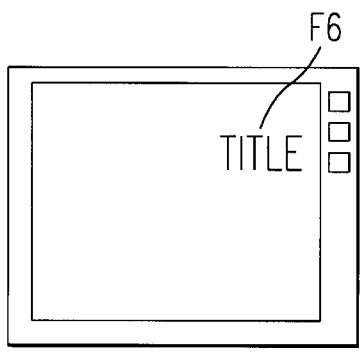

Furthermore, transformation method of the object may be changed by deciding whether the annotation is added to the object or all images of the frame. For example, the annotation added to the object is moved/transformed in relation to the object. On the other hand, the annotation added to all images of the frame is fixedly displayed at the same position. As shown in FIGS. 20A–20D, the annotation F5 drawn on the object OBJ1 is decided to be added to the object OBJ1, and the annotation F6 drawn on background is decided to be added to all images of the frame. Otherwise, the annotation drawn as a closed region such as a circle or a square is decided to be added to the object. In other case, the annotation is decided to be added to all images of the frame. As shown in FIGS. 20A–20C, the annotation F5 added to the object OBJ1 is moved in relation to moving of the object OBJ1. As shown in FIG. 20D, the annotation F6 added to all images of the frame is fixedly displayed at the same position.

Figure 21A:
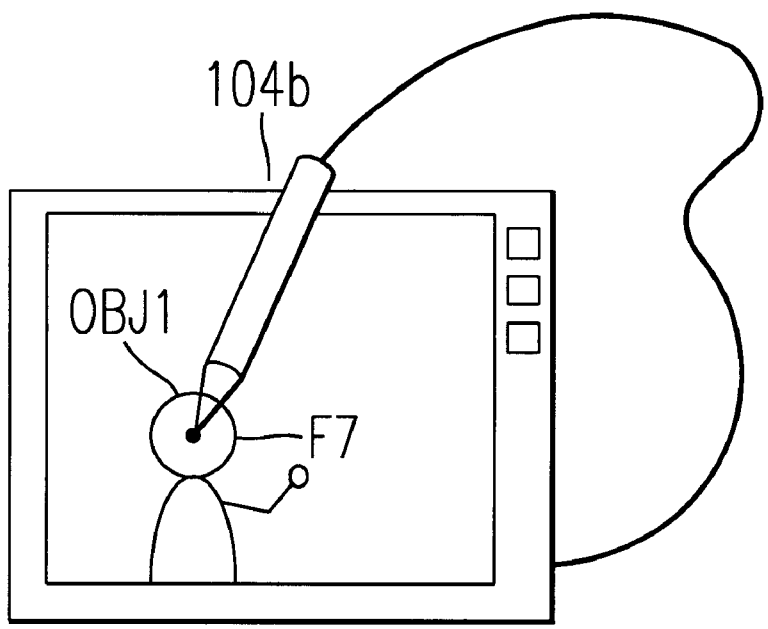
FIGS. 21A and 21B are schematic diagrams of screens to automatically display the annotation surrounding one object by pointing to the one object.
Figure 21B:
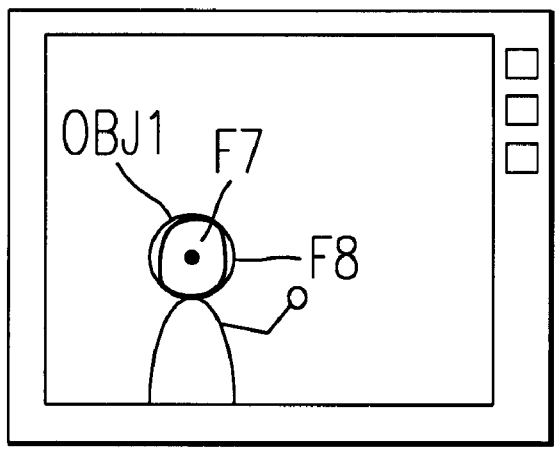

Furthermore, a difficult determination occurs if that the user draws the annotation for the moving object (for example, the moving object is surrounded by the pen). In this case, as shown in FIG. 21A, an arbitrary point F7 in the object OBJ4 is indicated by the pen 104b. The annotation transformation section 105 automatically selects the object OBJ4 and generates a figure image F8 surrounding the object OBJ4 as the annotation. This figure image F8 added to the object OBJ4 is displayed as shown in FIG. 21B.

Figure 22:
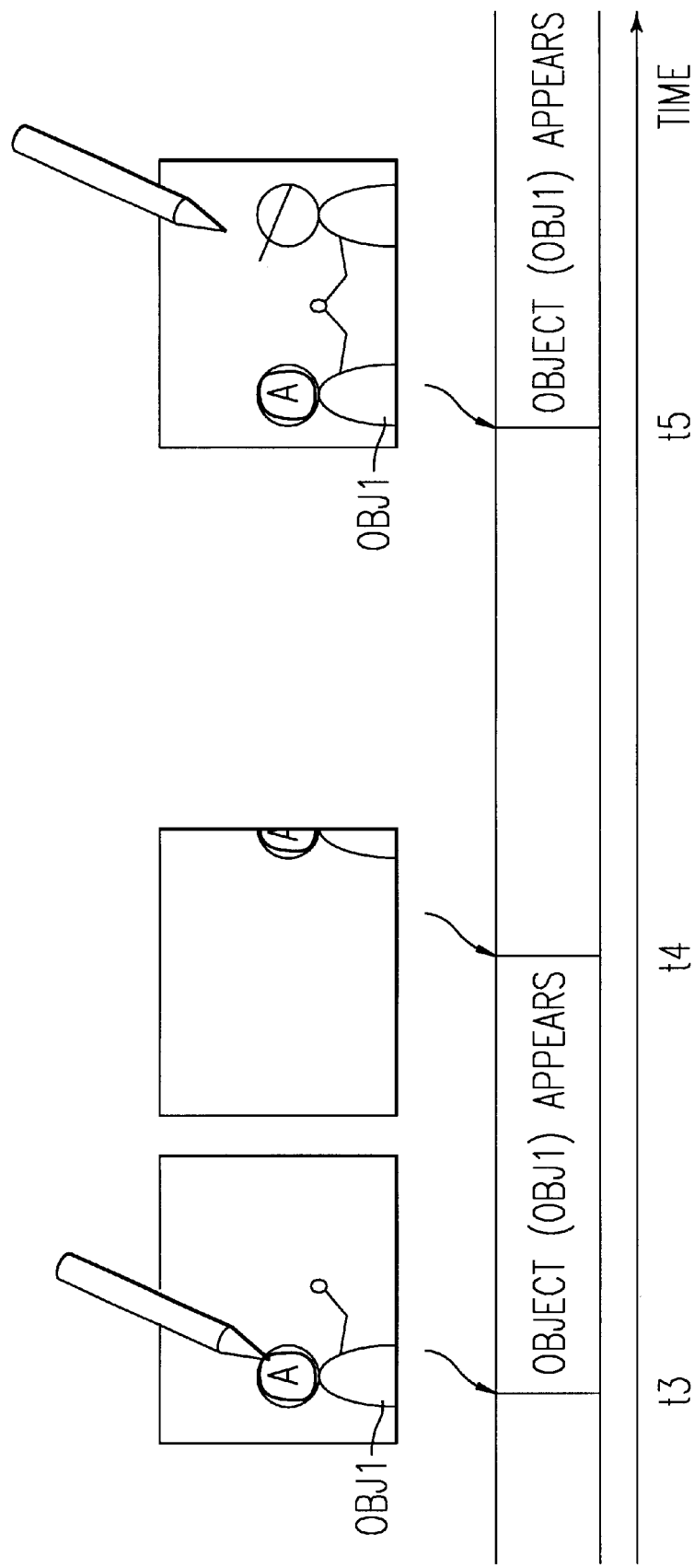
FIG. 22 is a schematic diagram of a time chart showing reappearance of the annotation by reappearance of the object in the dynamic images.

Furthermore, as shown in FIG. 22, assume that the annotation is added to the object OBJ1 at timing t3 and the object OBJ1 disappears in the frame at timing t4. In this case, when the object OBJ1 appears again in the frame at timing t5, the annotation may be displayed again. Otherwise, the color of the object may become dark in order to inform the addition of the annotation to the user.

Figure 23:
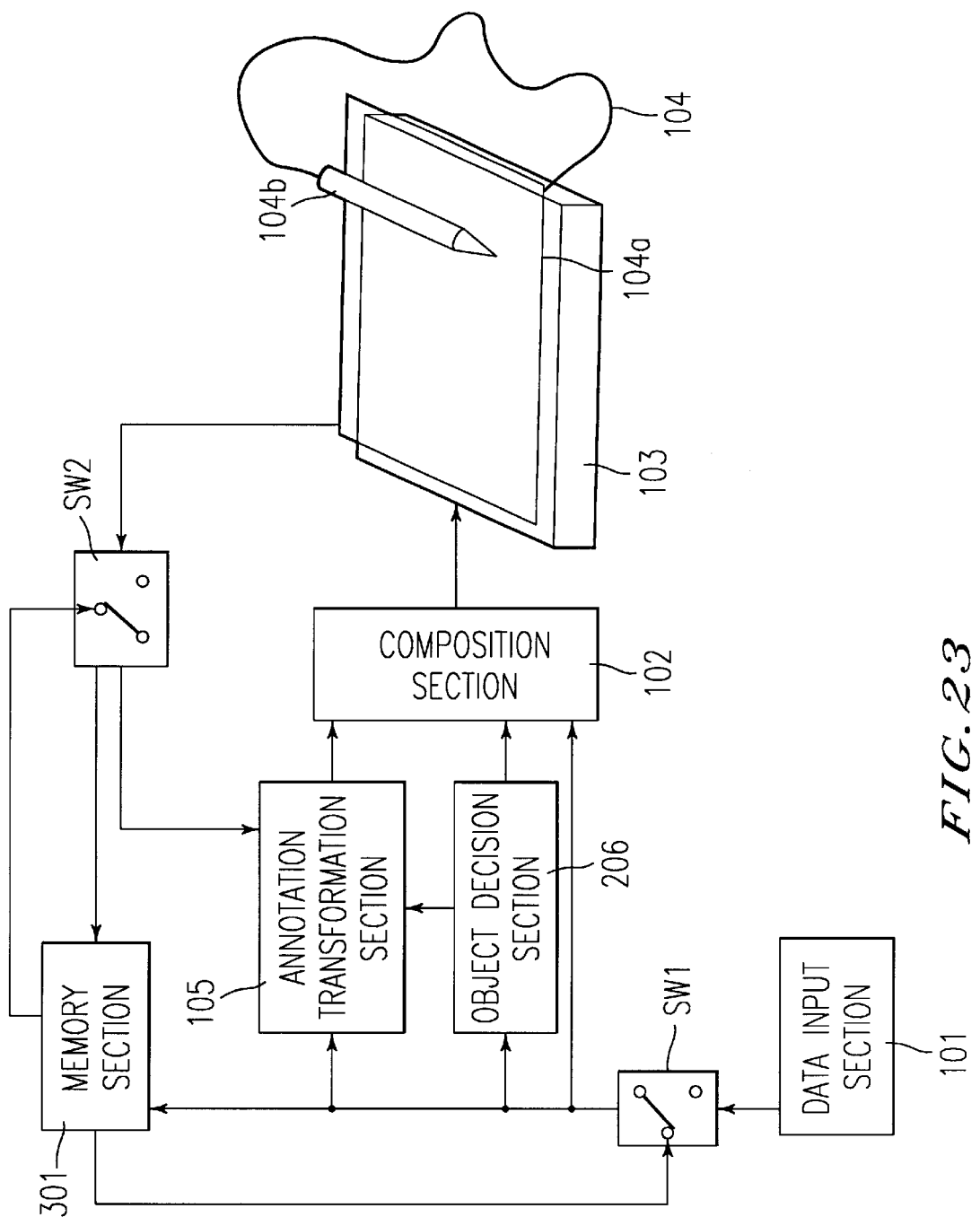
FIG. 23 is a block diagram of the information presentation apparatus according to a third embodiment of the present invention.

Next, a method, wherein the dynamic image and the annotation are stored and the annotation is transformed by change of the object in case of playing the dynamic image, is explained. In the first and second embodiments, the annotation added to the object in the dynamic image is not stored. However, in the third embodiment, the annotation is stored and the dynamic image is retried by referring to the annotation as a search key. In this case, the dynamic image including the object is used as the time series data in the same way as in the second embodiment. FIG. 23 is a block diagram of the information presentation apparatus according to the third embodiment. In FIG. 23, the dynamic image changeable by the passage of time is displayed on the output section 103 through the tablet 104a and the annotation is drawn on the displayed dynamic image by the pen 104b. A memory section 301 stores the dynamic image input from the data input section 101 and the annotation input from the annotation input section 104. In the case of storing data, a switch SW1 selects the dynamic image from the data input section 101 to the memory section 301, and a switch SW2 selects the annotation from the annotation input section 104 to the memory section 301. In the case of playing data, the switch SW1 selects the dynamic image from the memory section 301 to the annotation transformation section 105 and the object decision section 206, and the switch SW2 selects the annotation from the memory section 301 to the annotation transformation section 105.

Figure 24:
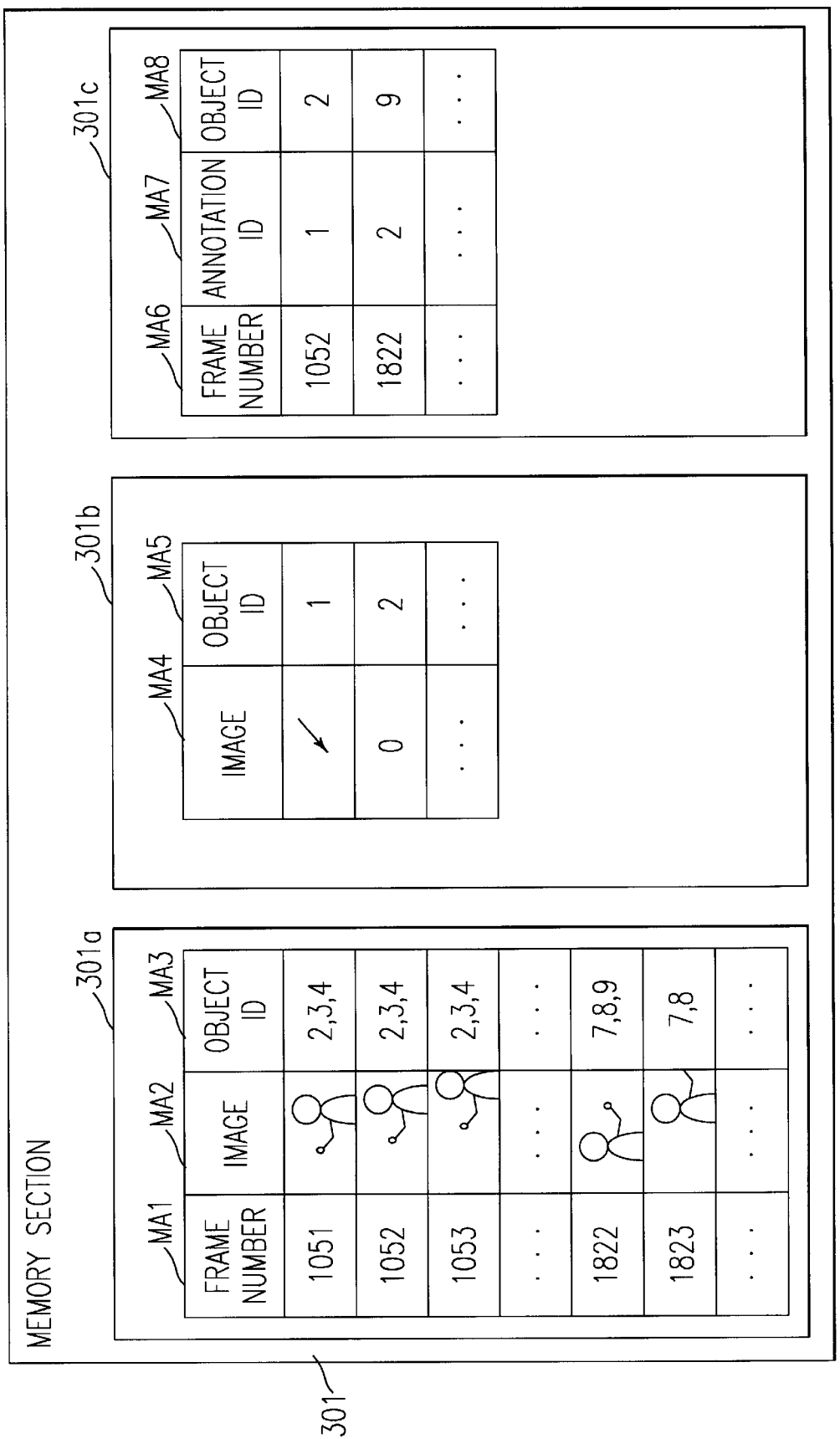
FIG. 24 is a schematic diagram of data format of a memory section in the information presentation apparatus of FIG. 23.

FIG. 24 is a schematic diagram of a data format stored in the memory section 301. As shown in FIG. 24, the memory section 301 includes a dynamic image memory 301a for storing the dynamic image and the object, an annotation memory 301b for storing the annotation, a relational memory 301c for storing a relation between the annotation and the object. In the dynamic image memory 301a, each frame of the dynamic image is stored in memory area MA2 in order of input. A frame number (the input order) is stored in memory area MA1 in correspondence with the frame. If the object is included in the frame, an identifier of the object (object ID) is stored in memory address MA3. In FIG. 24, the image of the frame number "1051" includes three objects. The object ID "2" represents a head part of the object, the object ID "3" represents a body part of the object, and the object ID "4" represents an arm part of the object.

The object ID is added as unique number to a part appeared newly in the image. For example, as for the object's part newly appeared, a number as the previous object ID incremented by 1 is added.

In the annotation memory 301b, the annotation is regarded as one block for sufficient time (for example, five seconds) from completion of input of the annotation, and the image of the annotation of each block is stored in memory area MA4. In correspondence with each block in the memory area MA4, an identifier of the annotation (annotation ID) is stored in memory area MA5 in order of input. In FIG. 24, as for an arrow image of the annotation in the memory area MA4, the annotation ID "1" is assigned.

In the relational memory 301c, correspondence information between the annotation ID and the object ID related with the annotation is stored. The frame number is stored in the memory area MA6, the annotation ID of the annotation added to the frame is stored in the memory area MA7, the object ID of the object related with the annotation is stored in the memory area MA8. In FIG. 24, the frame number "1052" and the annotation ID "1" are correspondingly stored because the arrow of the annotation is input to the dynamic image of the frame number "1052". Especially, the object ID "2" and the annotation ID "1" are correspondingly stored because the arrow of the annotation is added to the head part of the object in the dynamic image.

Figure 25:
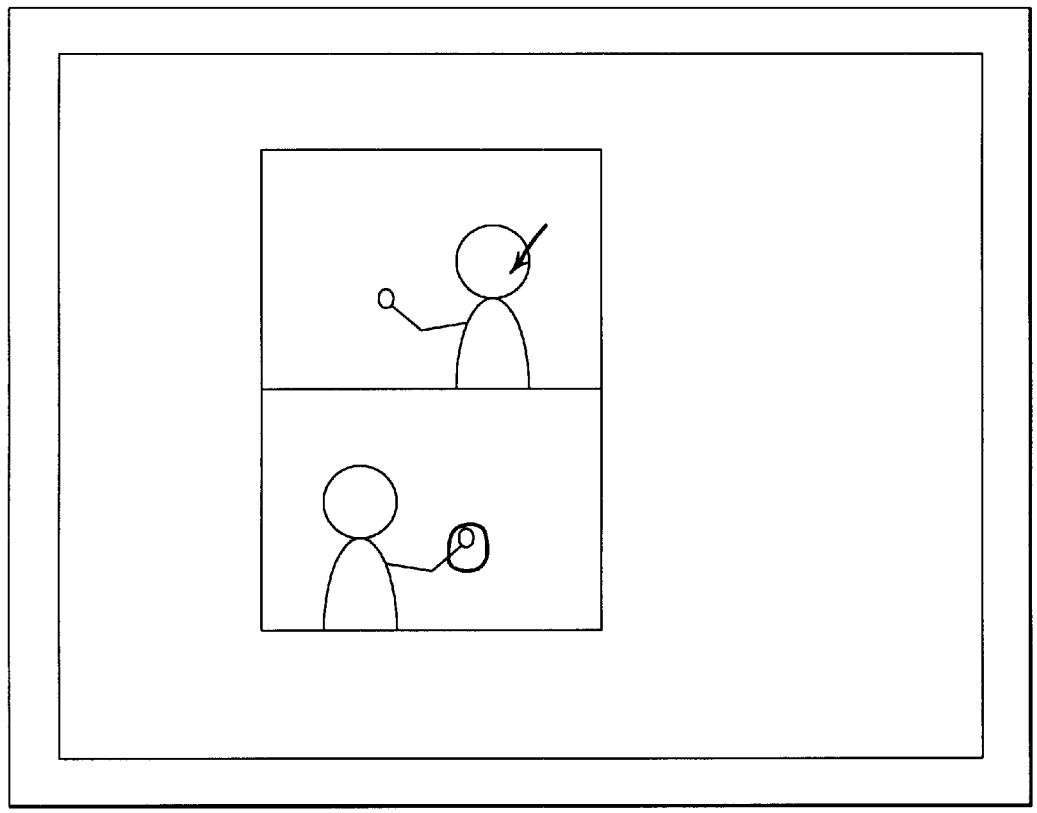
FIG. 25 is a schematic diagram of index images including the annotation and the object.

As shown in FIG. 25, the annotation and the frame to which the annotation is input are displayed as an index image. The user can smoothly select his desired index image by watching the annotation. After selecting the index image, the series of dynamic images are played from the index image as a start frame. Alternatively, in order to retrieve the dynamic image in the memory section 301, the annotation transformation section 105 reads out the annotation image in the annotation memory 301b in order. These annotation images are displayed by the output section 103 without combining with the frame. When the user selects one annotation from the displayed annotations, by referring to the frame number related to the one annotation ID in the relational memory 301c, a series of the frame images from the frame number as a start frame is read from the dynamic image memory 301a. Additionally, the annotation related to the frame images is read from the annotation memory 301b. The annotation is transformed in relation to the transformation of the object in the series of frame images by the annotation transformation section 105. The transformed annotation is combined with the frame image by the composition section 102. The series of frame images combined with the transformed annotation is played by the output section 103.

In case of playing the dynamic image and the annotation image stored in the memory section 301, the dynamic image output from the memory section 301 is selected and supplied to the object decision section 206 and the annotation transformation section 105 by the switch SW1. The annotation image output from the memory section 301 is selected and supplied to the annotation transformation section 105 by the switch SW2. In the memory section 301, the frame image stored in the dynamic image memory 301a is output in order of frame number. In this case, if the annotation ID related to the frame image is stored by referring to the relational memory 301c, the annotation image of the annotation ID is read from the annotation memory 301b and output in synchronization with the frame image. For example, in FIG. 24, the frame image of the frame number "1822" is decided to be related to the annotation image of the annotation ID "2" by referring to the relational memory 301c. In short, image data selected by the switches SW1 and SW2 are processed and played in the same way as in the second embodiment. Therefore, the dynamic image and the annotation related to the object in the dynamic image reappear.

As mentioned-above, in the third embodiment, the dynamic image and the annotation related to the object in the dynamic image are stored in the memory section 301. Hereinafter, in case of retrieving the dynamic image by referring to the annotation, or in the case of playing the dynamic images, the annotation is transformed in relation to transformation of the object in the dynamic images. As a result, the dynamic image and the annotation related to the object are repeatedly displayed while the position relation between the annotation and the object related to the annotation remains the same.

Figure 26:
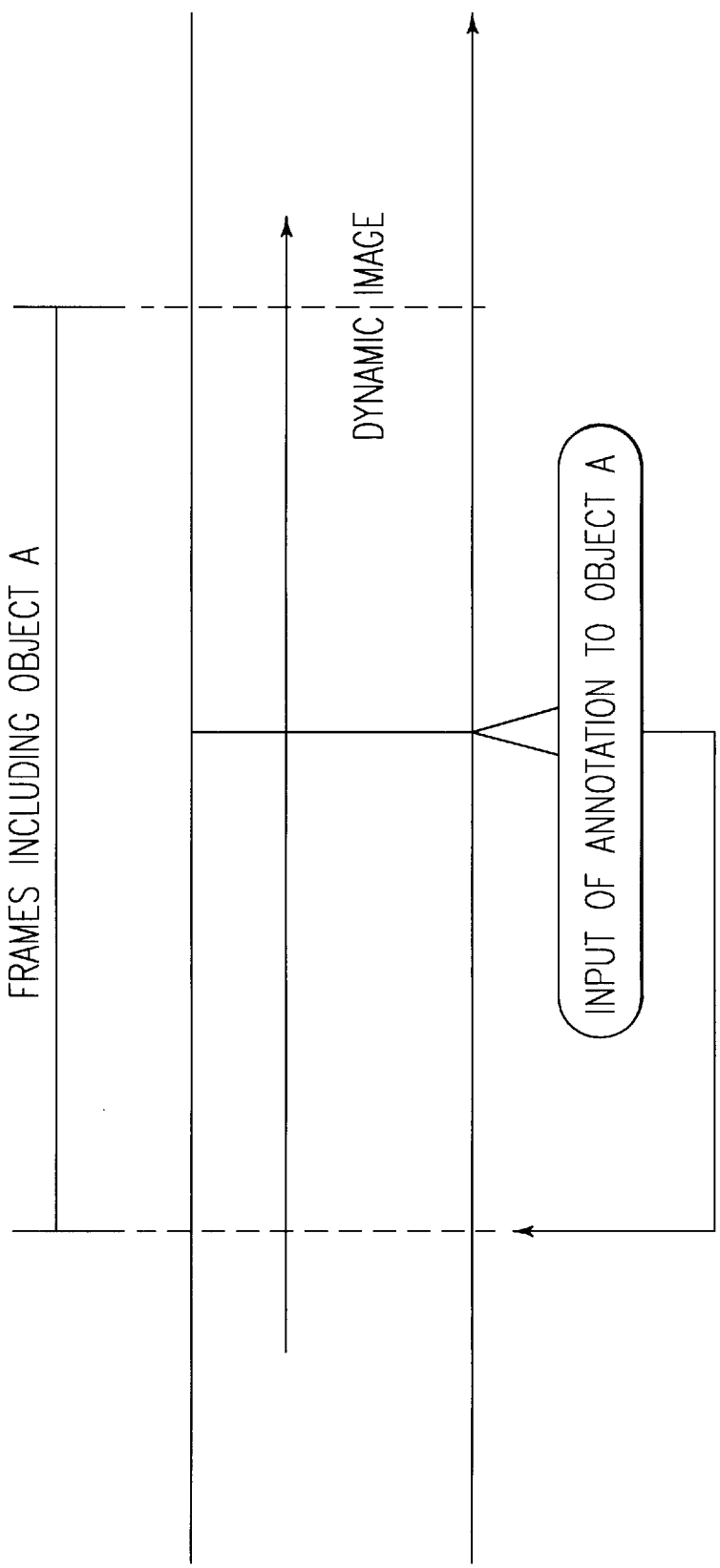
FIG. 26 is a schematic diagram of time chart showing the annotation added to the object by tracing first-appearance frame of the object in the dynamic image.

In the third embodiment, the dynamic images including the objects are stored, retrieved, and played. However, the dynamic images may not include the objects. Furthermore, in the case of synchronously playing the dynamic image and the annotation, even if a series of the dynamic images including the object related with the annotation is displayed, the annotation is not displayed until a frame image of the frame number corresponding to the annotation ID is displayed. However, the annotation may be displayed from the frame image in which the object related with the annotation appears first. Based on a time-lag from the user's watching the dynamic image to the user' input of the annotation, as shown in FIG. 26, the annotation is decided to be added to one frame in which the object related with the annotation appears first. In this case, the annotation is retroactively stored in correspondence with the one frame including the object first in the memory section 301. In the case of playing a series of dynamic images added to the annotation, the annotation is additionally displayed from the frame including the object related to the annotation first. The one frame including the object related to the annotation first is retrieved by referring to the object ID in the dynamic image memory 301a. For example, in FIG. 24, assume that the annotation is added to the object (head part) of the object ID "2" in the frame image of the frame number "1052". In this case, the object ID "2" is retrieved by retroactively tracing the object ID in the memory area MA3 from an address corresponding to the frame number "1052". The object ID "2" is detected from the frame image of the frame number "1051" first.

Furthermore, in case of adding the annotation to the object, if the annotation is already added to the same object appeared formerly in the dynamic image, the annotation is not necessary to be added. Therefore, it is important for the user to visually indicate whether the annotation is already added to the object. For example, as shown in FIG. 22, the annotation is already added to the object OBJ1 during the appearance of the object OBJ1 from the timing t3 to the timing t4. In this case, when the object OBJ1 reappears in the image at the timing t5, the object OBJ1 is displayed by a different mode (for example, highlight display, or the reappearance of the annotation) in order to inform addition of the annotation to the user.

Figure 27:
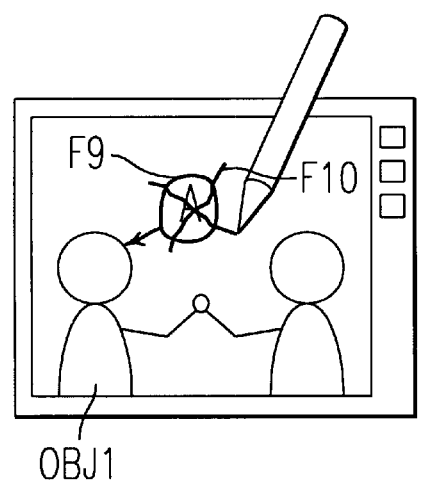
FIG. 27 is a schematic diagram of screen including delete operation of the annotation.

In the case of deleting (eliminating) the annotation added to the dynamic image, for example, as shown in FIG. 27, predetermined annotation F10 such as "X" mark indicating deletion is additionally drawn on the annotation F9. In this case, the information of the annotation F9 is eliminated from the annotation memory 301b and the relational memory 301c. Furthermore, the annotation may be further added during playing the dynamic images stored in the memory section 301. In this case, the information of new added annotation is additionally stored in the annotation memory 301b and the relational memory 301c.

A memory can be used to store instructions for performing the process described above. The process may be performed with the aid of a general purpose computer or microprocessor. Such a memory can thus be a CD-ROM, floppy disk, hard disk, magnetic tape, semiconductor memory, and so on.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. An information presentation apparatus, comprising:

data display means for displaying time series data as a dynamic image changeable over the passage of time;

annotation input means for inputting an annotation related to at least one of the time series data by handwriting a figure on said data display means while displaying the dynamic image, the annotation being the handwritten figure;

transformation means for transforming the annotation according to a correlation between the annotation and the time series data to be displayed, the transformation being at least one of elimination, movement, change of color degree, and change of size; and data combining means for combining the transformed annotation with the time series data, and for sending the combined data to said data display means.

2. The information presentation apparatus according to claim 1, further comprising an object detection means for detecting objects from the time series data, and wherein said transformation means transforms the annotation according to a correlation between the annotation and an object related with the annotation.

3. The information presentation apparatus according to claim 2, further comprising a memory for storing the time series data and the annotation related to the object in the time series data, and a retrieval means for retrieving the time series data including the object related to the annotation from said memory.

4. The information presentation apparatus according to claim 1, wherein said transformation means transforms the annotation according to a change in the content of the time series data.

5. The information presentation apparatus according to claim 1, further comprising a scene change detection means for detecting one of the time series images in which content changes, and wherein said transformation means eliminates the annotation from the one of the time series images successively in response to a detection signal of said scene change detection means.

6. The information presentation apparatus according to claim 1, wherein said transformation means gradually eliminates the annotation from the time series images in proportion to the passage of time.

7. The information presentation apparatus according to claim 1, wherein said data combining means stops updating of the time series image displayed during a period from the beginning of the input of the annotation to the completion of the input of the annotation through said annotation input means.

8. The information presentation apparatus according to claim 2, wherein said object detection means selects the object related to the annotation from each object in the time series image by comparing each distance between a position of the annotation and a position of each object.

9. The information presentation apparatus according to claim 8, wherein said transformation means moves the annotation in the time series image in proportion to the movement of the object related to the annotation.

10. The information presentation apparatus according to claim 9, wherein said transformation means creates a reflected image of the annotation if the annotation is positioned outside of the time series image to be displayed, and wherein said display means displays the reflected image with the object related to the annotation in the time series image.

11. The information presentation apparatus according to claim 8, wherein said transformation means enlarges or reduces the annotation in the time series image in respective proportion to and enlargement or reduction of the object related to the annotation.

12. The information presentation apparatus according to claim 8, wherein said object detection means selects an annotation related to a background image if the position of the annotation coincides with a predetermined area of the time series image, and wherein said transformation means does not move the annotation related to the background image in the time series image.

13. The information presentation apparatus according to claim 8, wherein said annotation input means indicates one point of the object to which the annotation is inputted, and wherein said transformation means automatically creates a circumferential figure of the object as the annotation.

14. The information presentation apparatus according to claim 13, wherein said data combining means eliminates the annotation from the time series image if the object related to the annotation does not appear in the time series image, and displays the annotation again in the time series image if the object related to the annotation reappears in the time series image.

15. The information presentation apparatus according to claim 3, wherein said memory includes a dynamic image memory section for storing frame number and object identifier for each image, an annotation memory section for storing annotation identifier for each annotation image, a relational memory section for storing the annotation identifier, the object identifier of the object related with the annotation, and the frame number of the image to which the annotation is inputted.

16. The information presentation apparatus according to claim 15,
   wherein said retrieval means retrieves the frame number, the annotation identifier and the object identifier from said relational memory, and
   wherein said output means displays the image of the frame number as an index image for a user, in which the annotation of the annotation identifier is related with the object of the object identifier.

17. The information presentation apparatus according to claim 15,
   wherein said retrieval means traces one image in which the object related to the annotation first appears, and newly adds the annotation to the object from the one image to the image of the frame number.

18. The information presentation apparatus according to claim 15,
   wherein said annotation input means indicates a deletion of the annotation related to the object in the time series image, and
   wherein said retrieval means eliminates the annotation identifier and the annotation image of the indicated annotation from said annotation memory and said relational memory.

19. An information presentation method, comprising:
   displaying time series data as a dynamic image changeable over the passage of time on a screen;
   inputting an annotation related to at least one of the time series data by handwriting a figure on the screen while displaying the dynamic image, the annotation being the handwritten figure;
   transforming the annotation according to a correlation between the annotation and the time series data to be displayed, the transformation being at least one of elimination, movement, change of color degree, and change of size;
   combining the transformed annotation with the time series data; and
   displaying the combined data on the screen.

20. A computer readable memory containing computer readable instructions, comprising:
   instruction means for causing a computer to display time series data as a dynamic image changeable over the passage of time on a screen;
   instruction means for causing a computer to input an annotation related to at least one of the time series data by handwriting a figure on the screen while displaying the dynamic image, the annotation being the handwritten figure;
   instruction means for causing a computer to transform the annotation according to a correlation between the annotation and the time series data to be displayed, the transformation being at least one of elimination, movement, change of color degree, and change of size;
   instruction means for causing a computer to combine the transformed annotation with the time series data; and
   instruction means for causing a computer to display the combined data on the screen.

21. An information presentation apparatus, comprising:
   a display configured to display time series data as a dynamic image changeable over the passage of time;
   an annotation input unit configured to input an annotation related to at least one of the time series data by handwriting a figure on said display while displaying the dynamic image, the annotation being the handwritten figure;
   a transformation unit configured to transform the annotation according to a correlation between the annotation and the time series data to be displayed, the transformation being at least one of elimination, movement, change of color degree, and change of size; and
   a data combining unit configured to combine the transformed annotation with the time series data, and to send the combined data to said display.

* * * * *